(12) United States Patent
Nair et al.

(10) Patent No.: US 11,238,047 B2
(45) Date of Patent: Feb. 1, 2022

(54) CO-APPLICANT CANDIDATE IDENTIFICATION BY WAY OF EDGE GRAPHS

(71) Applicant: iCreditWorks LLC, Mahwah, NJ (US)

(72) Inventors: Suresh G. Nair, Robbinsville, NJ (US); Stephen Earl Sweeney, Mahwah, NJ (US); Mark David Alexander, Upper Saddle River, NJ (US)

(73) Assignee: ICREDITWORKS LLC, Mahwah, NJ (US)

( * ) Notice: Subject to any disclaimer, the term of this patent is extended or adjusted under 35 U.S.C. 154(b) by 52 days.

(21) Appl. No.: 16/794,866

(22) Filed: Feb. 19, 2020

(65) Prior Publication Data

US 2021/0256026 A1    Aug. 19, 2021

(51) Int. Cl.
| | |
|---|---|
| *G06F 3/048* | (2013.01) |
| *G06F 16/2455* | (2019.01) |
| *G06F 16/901* | (2019.01) |
| *H04L 29/08* | (2006.01) |
| *G06F 3/0482* | (2013.01) |
| *G06Q 40/02* | (2012.01) |

(52) U.S. Cl.
CPC ...... *G06F 16/24553* (2019.01); *G06F 3/0482* (2013.01); *G06F 16/9024* (2019.01); *G06Q 40/025* (2013.01); *H04L 67/306* (2013.01)

(58) Field of Classification Search
None
See application file for complete search history.

(56) References Cited

U.S. PATENT DOCUMENTS

2017/0169508 A1*  6/2017  Song ............... G06Q 40/025

\* cited by examiner

*Primary Examiner* — William C Trapanese
(74) *Attorney, Agent, or Firm* — Fenwick & West LLP

(57) ABSTRACT

A system and a method are disclosed for identifying a co-applicant based on proximity to an applicant. In an embodiment, a processor determines a location of the applicant, and identifies a plurality of potential co-applicants that are collocated with the location of the applicant. For each respective potential co-applicant of the plurality of potential co-applicants, the processor determines whether a respective edge exists on a graph that connects the applicant with the respective potential co-applicant, and, responsive to determining that the respective edge exists, identifies the respective potential co-applicant as a candidate co-applicant. The processor generates for display, on a device of the applicant, a selectable option that, when selected, indicates that the applicant would like to use the candidate co-applicant as a co-applicant for an application. Responsive to detecting a selection of the selectable option, the processor activates the application at a device of the candidate co-applicant.

14 Claims, 6 Drawing Sheets

CO-APPLICANT CANDIDATE IDENTIFICATION BY WAY OF EDGE GRAPHS

TECHNICAL FIELD

The disclosure generally relates to the field of database operations, and more particularly relates to optimal selections based on connections between users as indicated by edge graphs.

BACKGROUND

Where a user wishes to direct electronic information to another user, existing systems are unable to assist the user with selection of the other user, and instead provide an index of names through which to scroll, as well as, at most, crude means to transition only partial information to the other user selected from the index. For example, where a user is submitting an application, and requires information from another user to complete the application, existing systems provide little assistance to the user in either selecting an optimal user for aiding in completion of the application, or passing sufficient information to any user for completion of the application.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
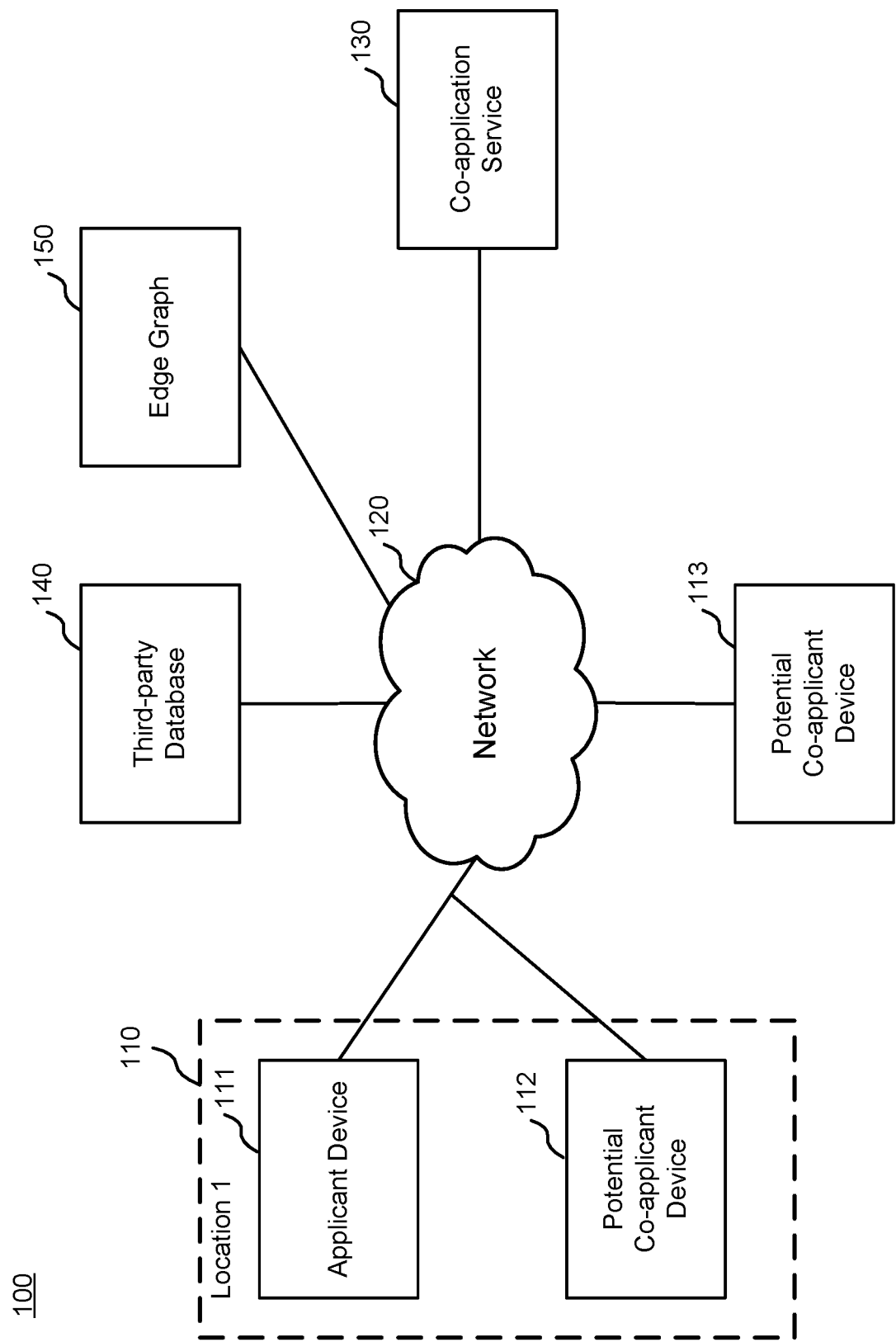
FIG. 1 illustrates one embodiment of a system environment for a co-application service to connect an applicant device to a co-applicant device using an edge graph.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes identifying a co-applicant based on proximity to an applicant. For example, a patient in a dentist's office may require a loan of $5,000 to obtain a dental procedure, but may not be, on his own, approved for more than a $2,000 loan. The processor may determine a location of the applicant, and may identify a plurality of potential co-applicants that are co-located with the location of the applicant. For example, the processor may identify who else is in the dentist's office, and may initially consider some or all of those people as potential co-applicants. For each respective potential co-applicant of the plurality of potential co-applicants, the processor may determine whether a respective edge exists on a graph that connects the applicant with the respective potential co-applicant. For example, the processor may determine whether the edge graph shows any of the potential co-applicants as friends or family of the applicant.

Responsive to determining that such a relationship is indicated in the edge graph, the processor may identify the respective potential co-applicants for whom the relationship exists as candidate co-applicants. The processor may generate for display, on a device of the applicant, a selectable option that, when selected, indicates that the applicant would like to use the candidate co-applicant as a co-applicant for an application. For example, the processor may cause the applicant's device to output a prompt that says "we noticed your father is at the dentist office with you, would you like to name your father as a co-applicant?" Responsive to detecting a selection of the selectable option, the processor may activate the application at a device of the candidate co-applicant. For example, the processor may pass a token to a mobile app running on the father's smart phone that pre-populates a co-application with information from the applicant's application.

Co-Application Service System Environment

FIG. 1 illustrates one embodiment of a system environment for a co-application service to connect an applicant device to a co-applicant device using an edge graph. System 100 includes applicant device 111, potential co-applicant device 112, potential co-applicant device 113, network 120, co-application service 130, third-party database 140, and edge graph 150. In an embodiment, applicant device 111 and potential co-applicant device 112, are co-located within location 110. Location 110 may be any defined boundary of space, such as applicant device 111 and potential co-applicant device 111 being within the confines of the same room or building, within a threshold distance of one another, within a threshold distance of a known fixed, point, and the like. The term co-located, as used herein, refers to a scenario where applicant device 111 and a potential co-applicant device are both within a same location 110. Potential co-applicant device 113 is distinguished from potential co-applicant device 112 in that it is outside of location 110, and at another location (e.g., "location 2," where location 110 is "location 1").

Applicant device 111 and potential co-applicant devices 112 and 113 may be any form of client device, such as a personal computer, a mobile device like a mobile phone, a laptop computer, or any other type of device configured to accept user input and transfer said user input to an application or server. Applicant device 111 is used by a user who is an applicant for some product or service. In an embodiment, applicant device 111 has a mobile application (referred to herein as "mobile app") installed thereon, where the mobile app includes a user interface through which the user of applicant device 111 (referred to herein as "applicant") fills out an application. The term application, as used herein, refers to an electronic user interface with graphical elements through which a user inputs information that is processed to make a determination as to whether to authorize the user to obtain a product or service. Co-applicant devices 112 and 113 are used by respective users who may be indicated by third-party database 140 and/or edge graph 150 as suited to act as a co-applicant on the application. Further details of components of a client device that may form applicant device 111 and/or co-applicant devices 112 and 113 are described below with respect to FIG. 3.

Applicant device 111 and potential co-applicant devices 112 and/or 113 (collectively, "the client devices") may communicate with co-application service 130 using network 120. Network 120 is a communications network, such as the Internet. Though not depicted, in an embodiment, some or all components of co-application service 130 are installed directly on one or more of the client devices, and thus need not be contacted over network 120. Co-application service 130 provides an interface to one or more applicants to access an application. The interface may be a dedicated mobile app installed on the client devices, or some other user interface accessible by way of a browser installed on the client devices. Co-application service 130 may be hosted on one or more servers or other computing devices.

Co-application service 130 may determine that an applicant requires a co-applicant in order to successfully complete an application. Co-application service 130 may perform this determination based on records in third-party database 140, which co-application service 130 may access over network 120. Third party database 140, though depicted as one database, may be composed of a plurality of databases, which may, in part or in full, be administered by different third-party entities. The records of third party database 140 may include public information about the applicant. Additionally, co-application service 130 may obtain authorization from applicant device 111 to obtain non-public information about the applicant, such as the applicant's credit score, in which case co-application service 130 may access records including such non-public information from third party database 140.

Where co-application service 130 determines that the applicant requires a co-applicant in order to successfully complete the application, co-application service 130 may determine (e.g., using the location of applicant device 111 and the location of potential co-applicant devices, such as co-applicant devices 112 and 113, and/or using edge graph 150), one or more recommended co-applicants. The manner in which co-application service 130 determines recommended co-applicants will be described in further detail below with respect to FIG. 3. Edge graph 150 is a database that indicates connections between the applicant and potential co-applicants. Potential co-applicants may be applicants that are determined by co-application service 130 to be known to the applicant. For example, co-application service 130 may access (e.g., with authorization from applicant device 111) a contacts list stored on applicant device 111, and may determine therefrom a plurality of people known to the applicant. As another example, co-application service 130 may access one or more social media applications and determine "friends" or "connections" of the applicant to be potential co-applicants. In order to determine which of the potential co-applicants to recommend to be the co-applicant of the applicant, co-application service 130 may access edge graph 150 to determine a type or strength of relationship between the applicant and the potential co-applicants, and may base a recommendation thereon. Further details about the manner in which co-application service 130 recommends a co-applicant to the applicant will be described in further detail below with respect to FIG. 3.

Exemplary Client Device (Applicant or Co-Applicant Device) Components

Figure 2:
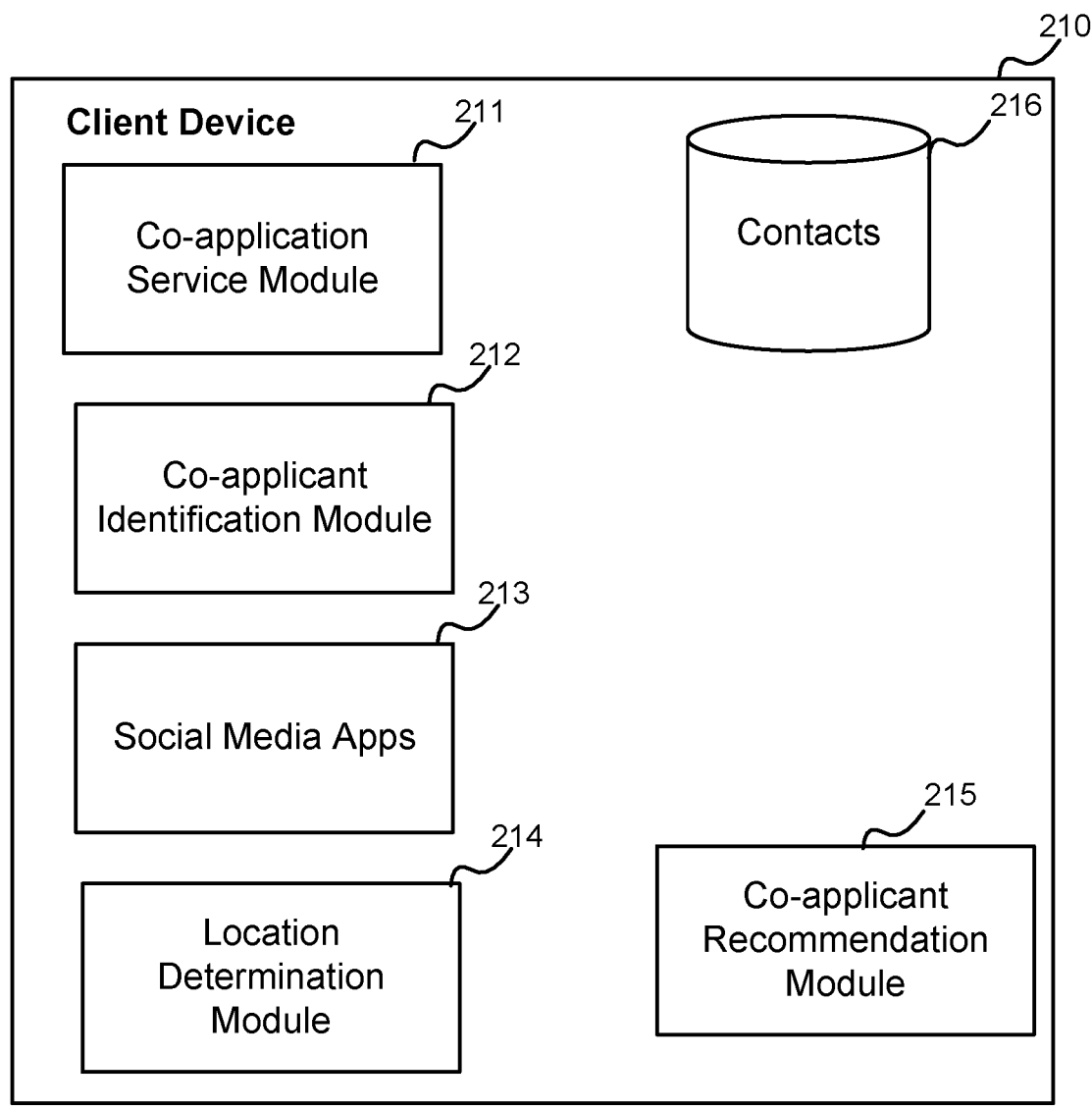
FIG. 2 illustrates one embodiment of detailed components of a client device that is communicatively coupled to the co-application service.

FIG. 2 illustrates one embodiment of detailed components of a client device that is communicatively coupled to the co-application service. Client device 210 includes co-application service module 211, location determination module 212, social media apps 213, user interface module 214, co-applicant recommendation module 215, and contacts database 216. These modules and databases are exemplary; fewer or more modules may be used, and fewer or more databases may be implemented as well. The modules and applications depicted in FIG. 2 may be executed by a processor of client device 210. The execution of the modules and/or the applications may be driven by computer-readable instructions on a non-transitory computer-readable medium that, when executed, cause the processor to perform the operations described with respect to FIG. 2. Client device 210 may have any functionality described with respect to FIG. 1. As mentioned above, applicant device 111, potential co-applicant device 112, and potential co-applicant device 113 are client devices, and thus may include some or all of the functionality described with respect to client device 210, and vice versa.

Co-application service module 211 may be a mobile app provided by co-application service 130 that is installed to client device 210. Alternatively, or additionally (by supplemental function), co-application service module 211 may be executed by a browser of client device 210 being navigated to a portal (e.g., web page) of co-application service 130. Co-application service module 211 provides an application to an applicant using client device 210. Based on input received during input by the user into the application, co-applicant service module transmits data to co-application service 130, along with a request for co-application service 130 to determine whether the applicant's application is successful. Where co-application service 130 determines that the applicant's application is successful, co-application service module 211 receives a confirmation, and may output a prompt to the user indicating that the application is successful, and co-application service 130 may transmit a notification to a provider of the product or service applied to indicating the same.

Where co-application service module 211 receives a response from co-application service 130 that the application is not successful, co-application service module 211 may determine, based on information in the response, attributes of the application that caused the application to not be successful. For example, the applicant's credit score may have been too low, or the applicant's existing liabilities may have caused the applicant to have his or her application denied outright. As another example, the applicant may have been approved in part (e.g., for one-third of the product or service desired), but may not be approved for the remainder (e.g., the remaining two thirds of the product or service desired). In either example, co-application service module 211 may determine that the application is eligible for one or more co-applicants, such that if the one or more co-applicants also submitted the application, the applicant may approved for the product or service.

Co-applicant identification module 212 identifies potential co-applicants for recommendation to the applicant. In an embodiment, co-applicant identification module 212 determines a location of the applicant device 111 on which co-applicant identification module 212 is running by querying location determination module 214 and receiving a location result that applicant device 111 is within location 110. Details of how the location is determined are discussed below with respect to location determination module 214. Co-applicant identification module 212 may identify potential co-applicant devices that are also within location 110 (e.g., potential co-applicant device 112). Practically speaking, if someone entered location 110 with the applicant who the applicant to whom the applicant has a strong relationship, there is a high likelihood that person would be the first person who applicant would ask to be the co-applicant. An example of such a scenario is a son being the applicant, the son applying for a dental procedure, and a strong likelihood that the father who entered the dental office with the son would be the son's preferred co-applicant.

Responsive to identifying the potential co-applicants in location 110, co-applicant identification module determines whether edge graph 150 indicates an edge between the applicant and any of the potential co-applicants. To perform this determination, co-applicant identification module 212 may retrieve edge information from edge graph 150, or may receive information from co-application service 130, co-application service 130 having determined the edge information by retrieving data from edge graph 150. The term edge graph, as used herein, refers to a database of edges that each represent a relationship between two people. The edge may show that two users are connected for one or more reasons (e.g., the two users exchanged "friend" requests, the two users indicated that they have a certain form of relationship, a system indicated to edge graph 150 that the two users are connected, etc.). The edge may show, in addition to the existence of a relationship, a strength and/or type of relationship. Types of relationships may be familial, friendship, of a specific nature (e.g., "play soccer together"), or any other type of relationship. A strength of relationship may be determined based on heuristics or machine learning algorithms that factor in any number of parameters, such as frequency of detected interaction (e.g., text messaging), time since last interaction (e.g., using a decay function to reduce the strength of the relationship as certain thresholds of time pass since the last interaction), and the like. The edge graph may be provided by co-application service 130, or may be a third-party edge graph. For example, co-applicant service module 211 may determine that the user uses one or more social media apps 213, and may request permission to access information from those social media apps 213, such as edge information about the user stored in an edge store 150 provided by a provider of the social media apps 213.

Responsive to detecting an edge between the applicant and a potential co-applicant, co-applicant identification module 212 may designate the potential co-applicant a candidate co-applicant. The term candidate co-applicant, as used herein, refers to a potential co-applicant who has a device (e.g., potential co-applicant device 112) in the same location (e.g., location 110) as the applicant, and who also has an edge in common with the user.

Responsive to not detecting an edge between the applicant and a potential co-applicant that is co-located with the applicant, co-applicant identification module 212 may identify potential co-applicants through other means. In an embodiment, co-applicant identification module 212 accesses contacts database 216, which may be a contacts list of contacts stored in, or accessible to via network 120, applicant device 111. Co-applicant identification module 212 may, for each of the contacts, determine whether the respective contact should be recommended by referencing relationship qualities on edge graph 150, and applying heuristics or a machine learning model to determine whether the respective contact is a suitable co-applicant. Co-applicant identification module 212, for any suitable co-applicant, may access publicly available information on third-party database 140 to determine whether a respective contact is prequalified, or likely to be approved, to be a co-applicant and cover the remaining need of the applicant. In another embodiment, rather than access contacts database 216, or in addition to accessing contacts database 216, co-applicant identification module 212 may identify contacts of the user by accessing one or more of social media apps 213, and may identify contacts for similar processing therefrom.

In an embodiment, location determination module 214 determines a location of a client device. In an alternative embodiment, location determination module 214 collects predetermined data from sensors of client device 210 and transmits that data to co-application service 130 for use in determining the location of the client device. In an embodiment, the user of client device 210 opts in to the collection of the predetermined data and/or the location determination. Absolute location, within a certain confidence information, may be determined based on GPS data. However, using location in a broader sense such as whether the user is within the boundaries of location 110, location determination module 214 may determine location of the user using sensors like BLUETOOTH, WiFi, camera sensors, or any other sensor that provides information that can be mapped to a given location. For example, short range signals like BLUETOOTH or WiFi may include indicia that they emanate from a source, such as a particular dentist's office. Camera sensors may capture images that are stored in entries of a database (e.g., third party database 140) that are known to be at a particular location 110.

Co-applicant recommendation module 215 recommends one or more potential co-applicants to the user for acting as a co-applicant on an application. Where one or more candidate co-applicants are co-located with the applicant, co-applicant recommendation module 215 may generate for display on client device 210 a prompt including selectable options inquiring whether the applicant wishes to select any of the one or more candidate co-applicants as a co-applicant. Responsive to detecting selection by the applicant of a candidate co-applicant, client device 210 and/or co-application service 130 may transmit a message to the client device of the co-applicant. The message may be addressed to the co-applicant based on address information in contacts database 216 and/or accessed via social media apps 213.

Co-application service module 211 and/or co-application service 130, after receiving confirmation from the co-applicant that they agree to be the co-applicant, may pass a token to the client device 210 of the co-applicant. The token pre-populates the co-application for the application with information already entered into the application, thus enabling the co-applicant to avoid re-entering information already known to co-application service 130.

Exemplary Co-Application Service Components

Figure 3:
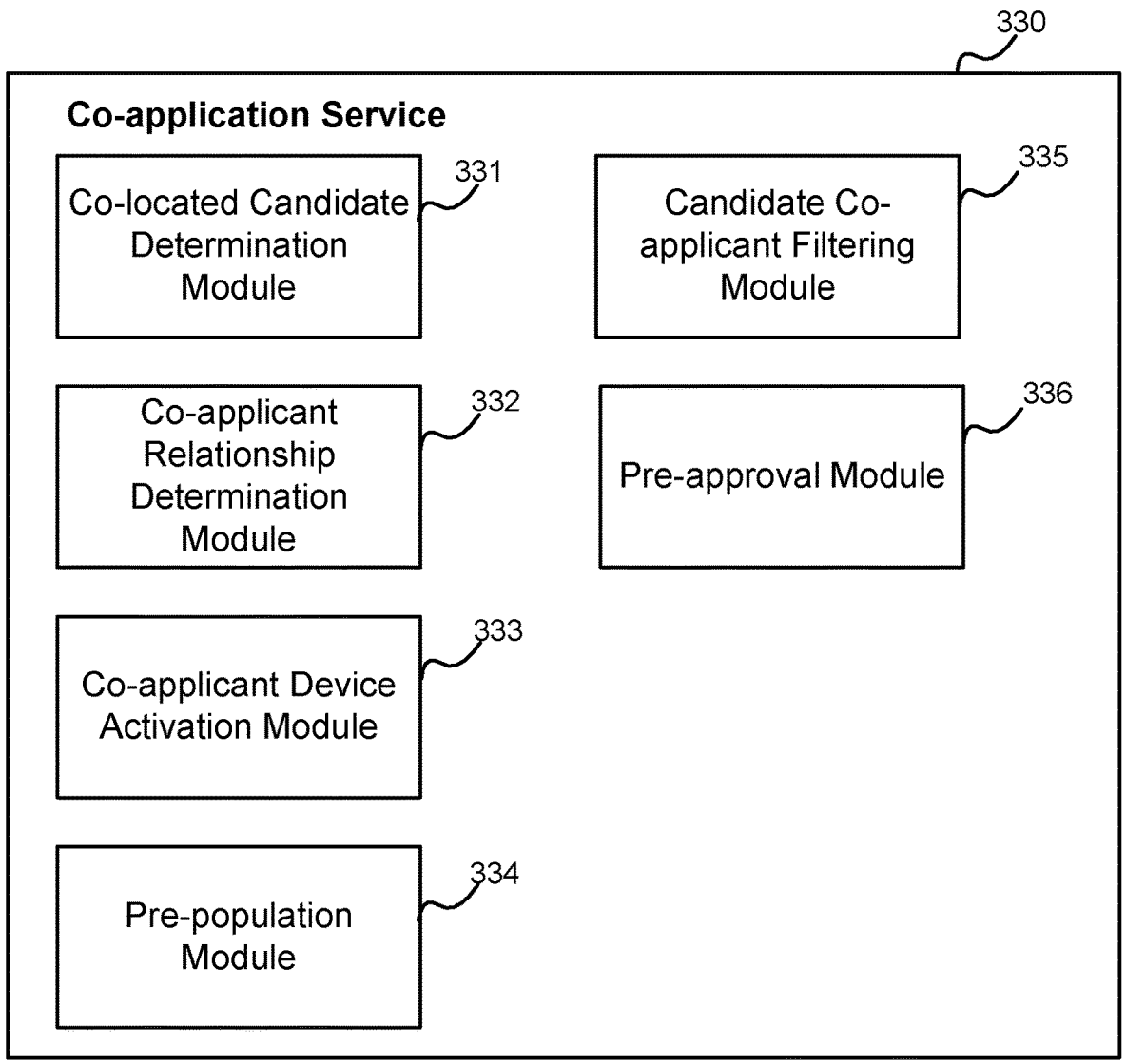
FIG. 3 illustrates one embodiment of detailed components of the co-application service.

FIG. 3 illustrates one embodiment of detailed components of the co-application service. Co-application service 330 includes co-located candidate determination module 331, co-applicant relationship determination module 332, co-applicant device activation module 333, pre-population module 334, candidate co-applicant filtering module 335, and preapproval module 336. These modules are exemplary; fewer or more modules may be used, and various databases may be implemented as well (e.g., important contacts database 216 to co-application service 330). The modules and applications depicted in FIG. 3 may be executed by a processor of one or more servers hosting co-application service 330. The execution of the modules and/or the applications may be driven by computer-readable instructions on a non-transitory computer-readable medium that, when executed, cause the processor to perform the operations described with respect to FIG. 2. Co-application service 330 may have any functionality described with respect to co-application service 130 of FIG. 1.

Co-located candidate determination module 331 determines whether applicant device 111 is co-located with a potential co-applicant device (e.g., potential co-applicant device 112). Manners of determining the location of applicant device 111, the location of determining the location of potential co-applicant device 112, and the manner of determining whether the devices are co-located (e.g., within location 110) are described with respect to location determination module 214 of FIG. 2, and equally apply here, based on location data and any other predefined data provided to co-application service 330 from the client devices.

Co-applicant relationship determination module 332 determines whether the applicant shares an edge of edge graph 150 with potential co-applicants. Such determination is described in further detail with respect to co-applicant identification module 212 of FIG. 2, the description of which is equally applicable here, where similar determinations are performed by co-application service 330 rather than, or in addition to, client device 210.

Co-applicant device activation module 333 provides access to some or all information of the applicant's application to a co-applicant selected by the applicant. For example, co-applicant device activation module 333 may, responsive to detecting a selection of a co-applicant by the applicant at client device 210, transmit the message to the selected co-applicant inquiring whether the co-applicant wishes to act as a co-applicant for the applicant. Responsive to receiving confirmation, co-applicant device activation module 333 may determine whether the client device of the co-applicant has co-application service module 211 installed. If the co-applicant service module 211 is not installed, co-applicant device activation module may prompt the co-applicant's client device to download and install the a mobile app including co-application service module 211, or may push an installation of the mobile app to the client device of the co-applicant, and may link the application to the mobile app of the client device of the co-applicant. Pre-population module 334 may push a token to the mobile app of the client device of the co-applicant including information specific to the application, and may command the mobile app to prepopulate the information within the co-application.

Candidate co-applicant filtering module determines which potential co-applicants to designate as candidate co-applicants, and ultimately which candidate co-applicants to recommend to the applicant to select as a desired co-applicant. Manners of identifying candidate co-applicants, and selecting which ones to recommend, are described above with respect to co-application service module 211, co-applicant identification module 212, and co-applicant recommendation module 215. Where processing of such information, in whole or in part, is to be executed by co-application service 130, the disclosure of each of those modules may be performed by candidate co-applicant filtering module 335.

Preapproval module 336 may be used as part of the filtering process of candidate co-applicant filtering module, where data about candidate co-applicants is retrieved from third-party database 140, and co-application service 130 uses said data to determine whether the candidate co-applicants are prequalified to act as a co-applicant for the applicant. Where co-applicants are not prequalified, candidate co-applicant filtering module 335 filters out those candidates.

Computing Machine Architecture

Figure 4:
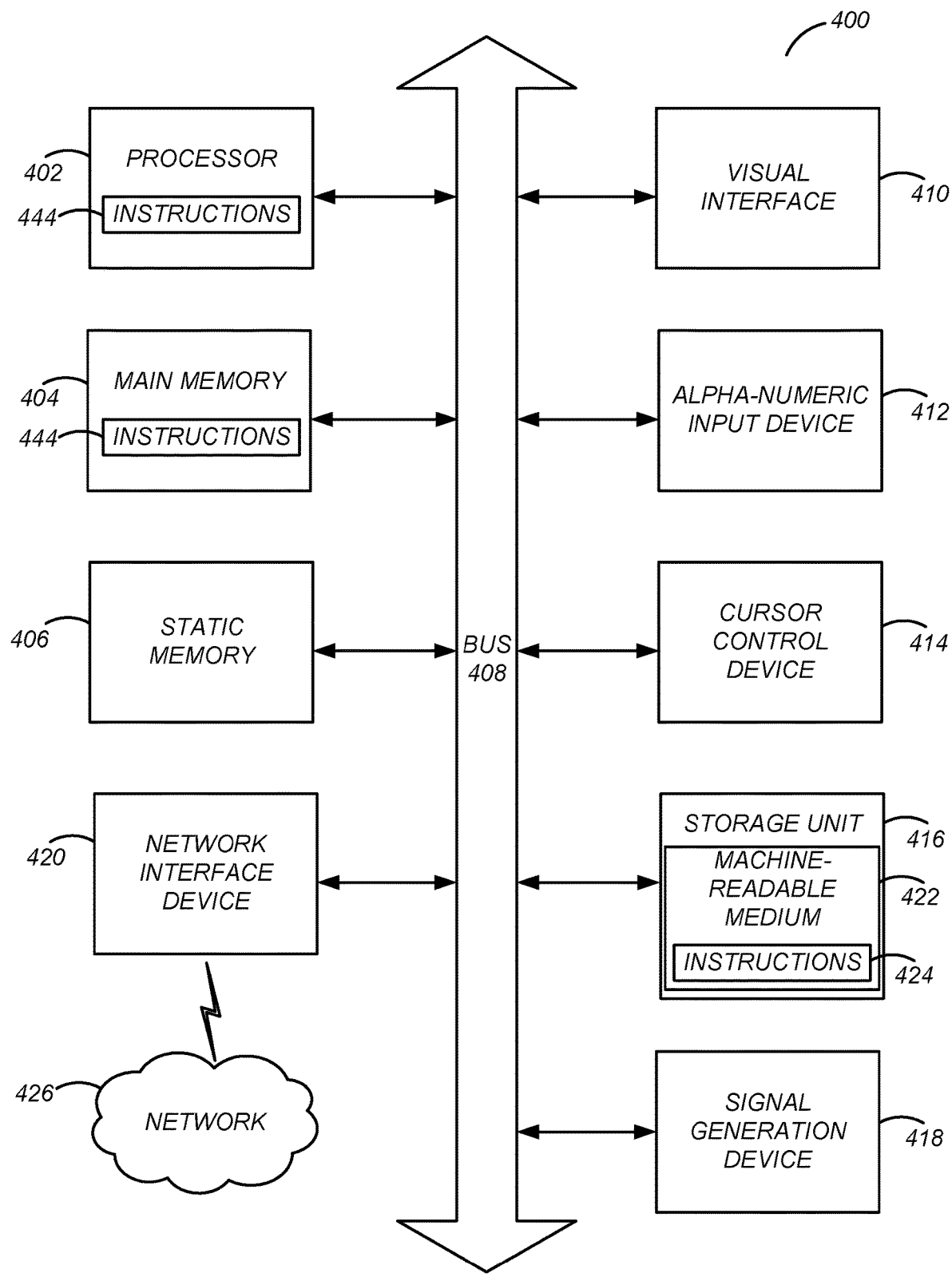
FIG. 4 is a block diagram illustrating components of an example machine able to read instructions from a machine-readable medium and execute them in a processor (or controller).

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alpha-numeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Exemplary Recommendation Sort Tool

Figure 5:
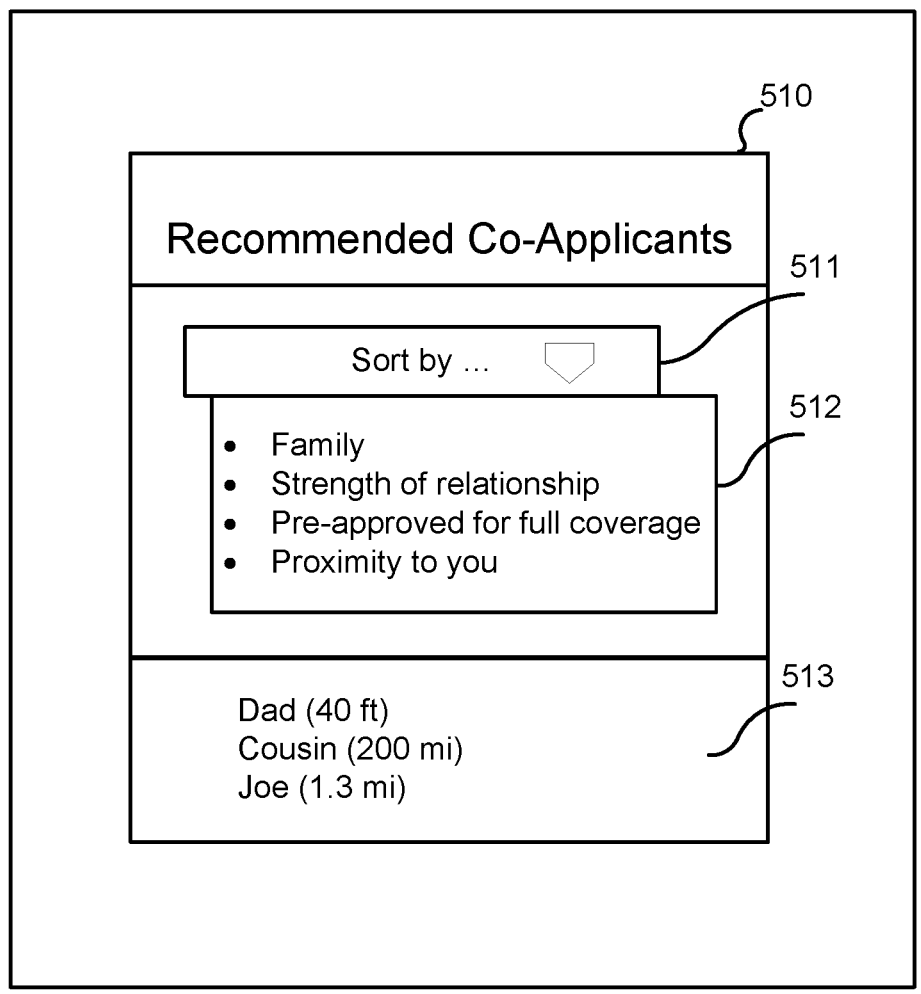
FIG. 5 illustrates one embodiment of an exemplary user interface for sorting recommended co-applicants by the applicant.

FIG. 5 illustrates one embodiment of an exemplary user interface for sorting recommended co-applicants by the applicant. User interface 510 may be displayed to a user of a client device, such as applicant device 111. User interface 510 may include recommendations of one or more candidate co-applicants 513. Candidate co-applicants 513 may be selectable, a selection of a candidate co-applicant (e.g., dad) causing a message to be sent to the selected candidate co-applicant inquiring as to whether the selected candidate co-applicant wishes to be a co-applicant. Optionally, an approximate or exact distance between the applicant device and a device of the co-applicant may be indicated in connection with each of candidate co-applicants 513.

Candidate co-applicants 513 may be sorted or filtered according to customization option 511. A user may select customization option 511 to indicate to the client device a manner in which candidate co-applicants 513 should be presented. For example, the candidate co-applicants 513 may be indicated as to be presented in order of familial relationship, strength of relationship (e.g., as indicated by edge graph 150), pre-approval, etc. Though not depicted, customization 511 may be a filter option, where users not satisfying what is selected (e.g., a pre-approval selection) causes those users to not be listed as candidate co-applicants 513.

Exemplary Co-Applicant Recommendation Process

Figure 6:
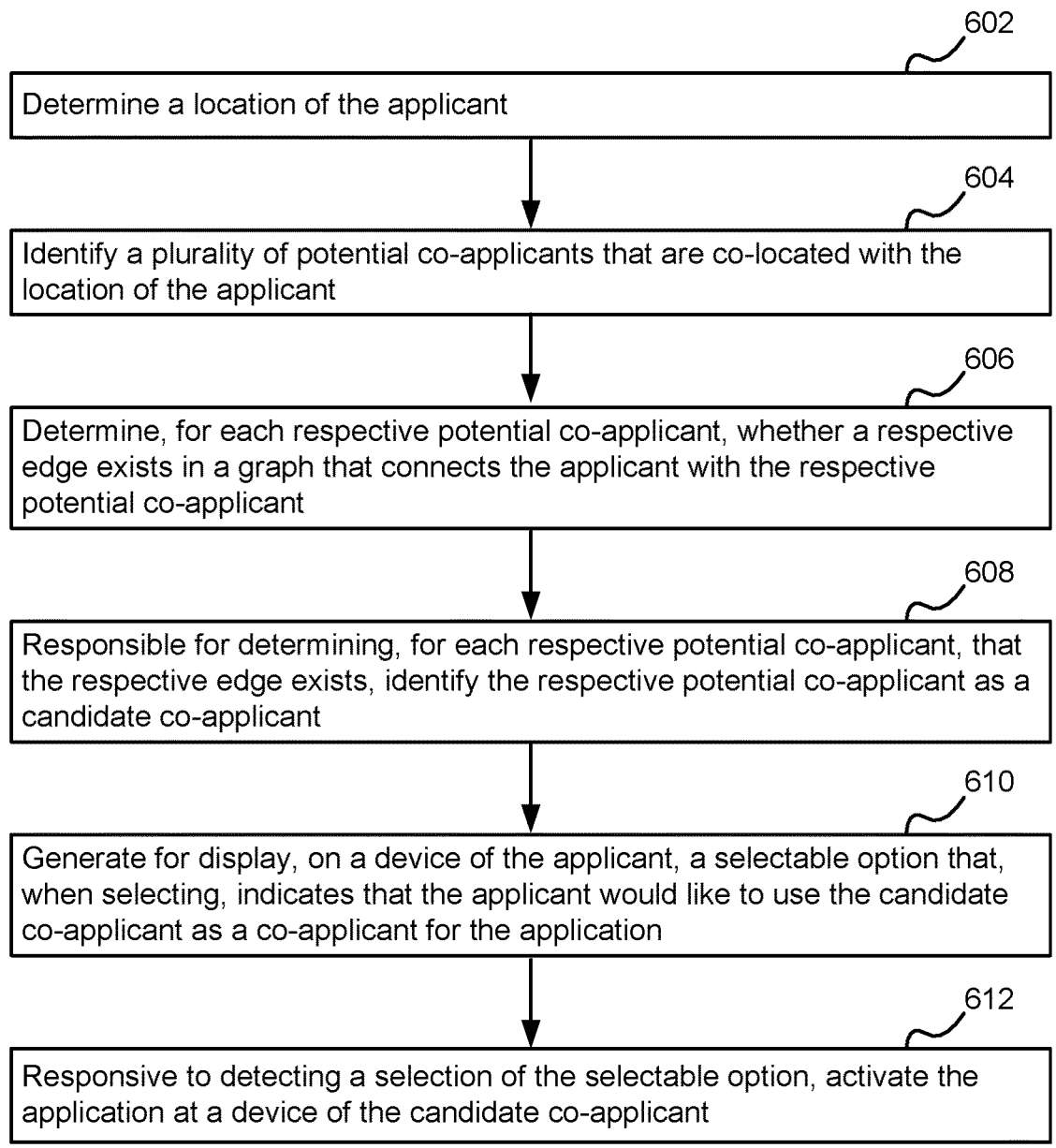
FIG. 6 illustrates one embodiment of an exemplary process for a co-application service to connect an applicant to a co-applicant.

FIG. 6 illustrates one embodiment of an exemplary process for a co-application service to connect an applicant to a co-applicant. Process 600 begins with co-application service 130 determining 602 a location of the applicant (e.g., by determining a location of applicant device 111). Co-application service 130 identifies 604 a plurality of potential co-applicants that are co-located with the location of the applicant. For example, co-application service 130 identifies potential co-applicant device 112 being co-located with applicant device 111 in location 110.

Co-application service 130 determines 606, for each respective potential co-applicant, whether a respective edge exists on a graph (e.g., edge graph 150) that connects the applicant with the respective potential co-applicant. Co-application service 130, responsive to determining, for each respective potential co-applicant, that the respective edge exists, identifies 608 the respective potential co-applicant as a candidate co-applicant. For example, responsive to determining that the applicant's father is also in location 1 (e.g., a dental office), identifies the applicant's father as a candidate co-applicant. This is as opposed to identifying another patient in the dental office who has no relationship to the applicant, and thus should not be identified as a candidate co-applicant.

Co-application service 130 generates for display 610, on a device of the applicant (e.g., applicant device 111), a selectable option (e.g., selectable ones of candidate co-applicants 513), indicates that the applicant would like to use the candidate co-applicant as a co-applicant for the application. Responsive to detecting a selection o the selectable option, co-application service 130 activates 612 the application at a device of the candidate co-applicant (e.g., potential co-applicant device 112).

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for implementing a co-application service through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for identifying a co-applicant based on proximity to an applicant, the method comprising:
    determining a location of the applicant;
    identifying a plurality of potential co-applicants that are collocated with the location of the applicant;
    for each respective potential co-applicant of the plurality of potential co-applicants:
        determining whether a respective edge exists on a graph that connects the applicant with the respective potential co-applicant; and
        responsive to determining that the respective edge exists, identifying the respective potential co-applicant as a candidate co-applicant;
    generating for display, on a device of the applicant, a selectable option that, when selected, indicates that the applicant would like to use the candidate co-applicant as a co-applicant for an application; and
    responsive to detecting a selection of the selectable option:
        activating the application at a device of the candidate co-applicant;
        passing a token to a mobile device application installed on a client device of the candidate co-applicant, the token including information based on input received from the applicant; and
        pre-populating, at the client device of the candidate co-applicant, using the token, the information.

2. The method of claim 1, wherein no candidate co-applicants are identified from the plurality of potential co-applicants, and wherein the method further comprises:
    determining that no candidate co-applicants are identified from the plurality of potential co-applicants;
    responsive to determining that no candidate co-applicants are identified from the plurality of co-applicants, accessing a contacts list of a device of the applicant; and
    designating a user of the contacts list a candidate co-applicant.

3. The method of claim 2, further comprising:
    accessing a database comprising profile information of the user;
    determining whether the profile information indicates that the user is prequalified to successfully complete the application; and
    designating the user as the candidate co-applicant responsive to determining that the profile information indicates that the user is prequalified to successfully complete the application.

4. The method of claim 1, wherein a plurality of candidate co-applicants are identified, and wherein the method further comprises:
    determining a responsibility to be undertaken by the co-applicant; and
    filtering the plurality of candidate co-applicants by removing, from the plurality of candidate co-applicants, those candidate co-applicants determined to be unqualified to undertake the responsibility.

5. The method of claim 1, wherein a plurality of candidate co-applicants are identified, and wherein the method further comprises:
    determining, for each respective candidate co-applicant, a strength of their respective edge; and
    generating for display a recommendation, along with the selectable option, that the respective candidate co-applicant with a highest strength be selected.

6. A non-transitory computer-readable medium comprising memory with instructions encoded thereon that, when executed by a processor, cause the processor to perform operations for identifying a co-applicant based on proximity to an applicant, the instructions comprising instructions to:
    determine a location of the applicant;
    identify a plurality of potential co-applicants that are collocated with the location of the applicant;
    for each respective potential co-applicant of the plurality of potential co-applicants:
        determine whether a respective edge exists on a graph that connects the applicant with the respective potential co-applicant; and
        responsive to determining that the respective edge exists, identify the respective potential co-applicant as a candidate co-applicant;
    generate for display, on a device of the applicant, a selectable option that, when selected, indicates that the applicant would like to use the candidate co-applicant as a co-applicant for an application; and
    responsive to detecting a selection of the selectable option:
        activate the application at a device of the candidate co-applicant;
        pass a token to a mobile device application installed on a client device of the candidate co-applicant, the token including information based on input received from the applicant; and
        pre-populate, at the client device of the candidate co-applicant, using the token, the information.

7. The non-transitory computer-readable medium of claim 6, wherein no candidate co-applicants are identified from the plurality of potential co-applicants, and wherein the instructions further comprise instructions to:
    determine that no candidate co-applicants are identified from the plurality of potential co-applicants;
    responsive to determining that no candidate co-applicants are identified from the plurality of co-applicants, access a contacts list of a device of the applicant; and
    designate a user of the contacts list a candidate co-applicant.

8. The non-transitory computer-readable medium of claim 7, wherein the instructions further comprise instructions to:
    access a database comprising profile information of the user;

determine whether the profile information indicates that the user is prequalified to successfully complete the application; and designate the user as the candidate co-applicant responsive to determining that the profile information indicates that the user is prequalified to successfully complete the application.

9. The non-transitory computer-readable medium of claim 6, wherein a plurality of candidate co-applicants are identified, and wherein the instructions further comprise instructions to:

determine a responsibility to be undertaken by the co-applicant; and filter the plurality of candidate co-applicants by removing, from the plurality of candidate co-applicants, those candidate co-applicants determined to be unqualified to undertake the responsibility.

10. The non-transitory computer-readable medium of claim 6, wherein a plurality of candidate co-applicants are identified, and wherein the instructions further comprise instructions to:

determine, for each respective candidate co-applicant, a strength of their respective edge; and generate for display a recommendation, along with the selectable option, that the respective candidate co-applicant with a highest strength be selected.

11. A system for identifying a co-applicant based on proximity to an applicant, the system comprising:

a processor; and a non-transitory computer readable medium comprising memory with instructions encoded thereon that, when executed, cause the processor to perform the operations of:

identifying a plurality of potential co-applicants that are collocated with the location of the applicant;

for each respective potential co-applicant of the plurality of potential co-applicants:

determining whether a respective edge exists on a graph that connects the applicant with the respective potential co-applicant; and responsive to determining that the respective edge exists, identifying the respective potential co-applicant as a candidate co-applicant;

generating for display, on a device of the applicant, a selectable option that, when selected, indicates that the applicant would like to use the candidate co-applicant as a co-applicant for an application; and responsive to detecting a selection of the selectable option:

activating the application at a device of the candidate co-applicant;

passing a token to a mobile device application installed on a client device of the candidate co-applicant, the token including information based on input received from the applicant; and pre-populating, at the client device of the candidate co-applicant, using the token, the information.

12. The system of claim 11, wherein no candidate co-applicants are identified from the plurality of potential co-applicants, and wherein the operations further comprise:

determining that no candidate co-applicants are identified from the plurality of potential co-applicants;

responsive to determining that no candidate co-applicants are identified from the plurality of co-applicants, accessing a contacts list of a device of the applicant; and designating a user of the contacts list a candidate co-applicant.

13. The system of claim 12, wherein the operations further comprise:

accessing a database comprising profile information of the user;

determining whether the profile information indicates that the user is prequalified to successfully complete the application; and designating the user as the candidate co-applicant responsive to determining that the profile information indicates that the user is prequalified to successfully complete the application.

14. The system of claim 11, wherein a plurality of candidate co-applicants are identified, and wherein the operations further comprise:

determining a responsibility to be undertaken by the co-applicant; and filtering the plurality of candidate co-applicants by removing, from the plurality of candidate co-applicants, those candidate co-applicants determined to be unqualified to undertake the responsibility.

* * * * *